United States Patent
Ueo et al.

(10) Patent No.: US 10,384,543 B2
(45) Date of Patent: Aug. 20, 2019

(54) ELECTRICALLY POWERED VEHICLE

(71) Applicant: Toyota Jidosha Kabushiki Kaisha, Toyota-shi, Aichi-ken (JP)

(72) Inventors: Daisuke Ueo, Nagoya (JP); Keisuke Kanamaru, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/723,617

(22) Filed: Oct. 3, 2017

(65) Prior Publication Data

US 2018/0118028 A1    May 3, 2018

(30) Foreign Application Priority Data

Oct. 27, 2016  (JP) ................. 2016-210817

(51) Int. Cl.
*B60K 35/00* (2006.01)
*B60L 1/00* (2006.01)
*B60L 53/10* (2019.01)

(52) U.S. Cl.
CPC ............ *B60K 35/00* (2013.01); *B60L 1/006* (2013.01); *B60L 53/11* (2019.02); *B60K 2350/106* (2013.01); *B60K 2350/1096* (2013.01); *B60L 2250/16* (2013.01); *B60Y 2200/91* (2013.01)

(58) Field of Classification Search
CPC .......................... B60L 11/1824; B60L 11/005; B60L 11/1803; B60L 11/1818; B60L 11/185; B60L 11/1861; B60L 3/0069; B60L 3/04; B60L 2210/10; B60L 2210/30; H02J 7/00
See application file for complete search history.

(56) References Cited

U.S. PATENT DOCUMENTS

| | | | |
|---|---|---|---|
| 2012/0228933 A1 | 9/2012 | Shiokawa | |
| 2013/0207607 A1* | 8/2013 | Sugiyama | H02J 3/38 320/109 |
| 2013/0314034 A1* | 11/2013 | Ang | H02J 7/1438 320/107 |
| 2014/0042966 A1* | 2/2014 | Masuda | B60L 53/22 320/109 |

(Continued)

FOREIGN PATENT DOCUMENTS

| JP | 2009-281979 A | 12/2009 |
|---|---|---|
| JP | 2011-083058 A | 4/2011 |

(Continued)

*Primary Examiner* — Hai Phan
*Assistant Examiner* — Anthony D Afrifa-Kyei
(74) *Attorney, Agent, or Firm* — Dinsmore & Shohl LLP (57) ABSTRACT

An electrically powered vehicle includes a power supply device, a first outlet configured to be connectable to external equipment that is not constituent equipment of a vehicle, a second outlet configured to be connectable to external equipment that is not constituent equipment of the vehicle, a display device configured to display a first image representing that first power feed is in progress and a second image representing that second power feed is in progress, and an electronic control unit configured to control an image to be displayed on the display device. In a case where the first power feed and the second power feed are being executed, the electronic control unit is configured to perform control such that a display form of the first image is more noticeable than a display form of the second image.

8 Claims, 5 Drawing Sheets (56) References Cited

U.S. PATENT DOCUMENTS

2015/0375621 A1* 12/2015 Ono .................. B60L 1/003
                                                                307/10.1
2016/0059720 A1    3/2016 Yamamoto
2016/0107530 A1* 4/2016 Roberts ............ B60L 11/1818
                                                                 320/109

FOREIGN PATENT DOCUMENTS

| JP | 2011-093491 A | | 5/2011 | |
| JP | 2011093491 A | * | 5/2011 | ............ B60L 15/20 |
| JP | 2014-239621 A | | 12/2014 | |
| JP | 2015-051685 A | | 3/2015 | |
| JP | 2015-134524 A | | 7/2015 | |
| WO | 2014/162883 A1 | | 10/2014 | |
| WO | 2014/199203 A2 | | 12/2014 | |

\* cited by examiner

ELECTRICALLY POWERED VEHICLE

CROSS-REFERENCE TO RELATED APPLICATIONS

This application claims priority to Japanese Patent Application No. 2016-210817 filed on Oct. 27, 2016 which is incorporated herein by reference in its entirety including the specification, drawings and abstract.

BACKGROUND

1. Technical Field

The present disclosure relates to an electrically powered vehicle, and in particular, to an electrically powered vehicle configured to perform power feed to electrical equipment (hereinafter, also referred to as "external equipment") that is not constituent equipment of the vehicle.

2. Description of Related Art

In an electrically powered vehicle (an electric vehicle, a hybrid vehicle, a fuel cell vehicle, or the like) capable of traveling using an electric motor, in general, an electric power storage device (a battery or the like) that stores electric power for driving the electric motor is mounted. In a hybrid vehicle and a fuel cell vehicle, in general, an electric power generation device (a generator, a fuel cell, or the like) is mounted in addition to the electric power storage device.

Among electrically powered vehicles, there is an electrically powered vehicle that is configured to be executable power feed (hereinafter, referred to as "external power feed") from one or both (hereinafter, referred to as "power supply device") of an in-vehicle electric power storage device and an electric power generation device to external equipment. For example, Japanese Unexamined Patent Application Publication No. 2011-93491 (JP 2011-93491 A) discloses a hybrid vehicle in which, as an outlet for external power feed, a service outlet (AC outlet) capable of feeding small electric power is provided in a vehicle cabin. The hybrid vehicle includes a display device that displays an image indicating that external power feed is in progress (specifically, an arrow line indicating a flow of electric power energy of external power feed) in order to give a user notification that external power feed using the service outlet is in progress.

SUMMARY

Among electrically powered vehicles, there is an electrically powered vehicle that is configured to be executable, as external power feed, large electric power feed for housing in addition to small electric power feed for a service outlet in a vehicle cabin disclosed in JP 2011-93491 A.

In an electrically powered vehicle that is executable large electric power feed and small electric power feed, when executing large electric power feed and small electric power feed, at least one of an image indicating that small electric power feed is in progress and an image indicating that large electric power feed is in progress is displayed on the display device, whereby it is possible to give the user notification that large electric power feed and/or small electric power feed is in progress.

However, in a case where a display form of the image indicating that small electric power feed is in progress and a display form of the image indicating that large electric power feed is in progress are similar, the magnitude of actual external electric power may not match the magnitude of external electric power ascertained from the image by the user. Specifically, although an output of large electric power feed is considerably larger than an output of small electric power feed, in a case where the display forms of both images are similar, there is a possibility that the user who views the images erroneously ascertains that the output of large electric power feed substantially has the same magnitude as the output of small electric power feed.

The present disclosure relates to an electrically powered vehicle that is executable first power feed capable of outputting large electric power and second power feed capable of outputting small electric power and makes a user intuitively ascertain the difference between the magnitude of first power feed electric power and the magnitude of second power feed electric power.

An aspect of the present disclosure relates to an electrically powered vehicle including a power supply device, a first outlet, a second outlet, a display device, and an electronic control unit. The first outlet is configured to be connectable to external equipment that is not constituent equipment of the vehicle. The second outlet is configured to be connectable to external equipment that is not constituent equipment of the vehicle. The display device is configured to display a first image representing that first power feed for feeding electric power from the power supply device to the external equipment connected to the first outlet is being executed and a second image representing that second power feed for feeding electric power from the power supply device to the external equipment connected to the second outlet is being executed. The electronic control unit is configured to control an image that is displayed on the display device. Maximum electric power of the first power feed is greater than maximum electric power of the second power feed, and when the first power feed and the second power feed are being executed, the electronic control unit is configured to control a display form of the first image and a display form of the second image such that the display form of the first image is more noticeable than the display form of the second image.

According to the aspect, in a case where the first power feed and the second power feed are being executed, control is performed such that the display form of the first image is more noticeable than the display form of the second image. With this, it is possible to allow the user to intuitively ascertain the difference between the magnitude of electric power of the first power feed and the magnitude of electric power of the second power feed, specifically, that electric power of the first power feed is larger than electric power of the second power feed.

In the electrically powered vehicle according to the aspect, the first image may be represented by a line indicating a flow of electric power of the first power feed. The second image may be represented by a line indicating a flow of electric power of the second power feed. The line of the first image may be thicker than the line of the second image.

According to the aspect, the line of the first image is made thicker than the line of the second image, whereby it is possible to make the first image more noticeable than the second image.

In the electrically powered vehicle according to the aspect, the electronic control unit may be configured to control the display device such that the display device makes the line of the first image thicker when electric power of the first power feed is large than when electric power of the first power feed is small.

According to the aspect, since the line of the first image has a thickness reflecting the magnitude of actual electric power of the first power feed, it is possible to allow the user to more accurately ascertain the magnitude of electric power of the first power feed.

In the electrically powered vehicle according to the aspect, the electronic control unit may be configured to inhibit changing a thickness of the line of the second image depending on magnitude of electric power of the second power feed.

In the electrically powered vehicle according to the aspect, the electronic control unit may be configured to display the first image on the display device and to inhibit displaying the second image on the display device in a case where the first power feed and the second power feed are being executed.

According to the aspect, the first image is displayed on the display device, and displaying the second image on the display device is inhibited, whereby it is possible to make the first image more noticeable than the second image.

In the electrically powered vehicle according to the aspect, the electronic control unit may be configured to display the first image on the display device and to inhibit displaying the second image on the display device when the first power feed and the second power feed are being executed and when electric power of the first power feed is equal to or greater than a threshold.

According to the aspect, while the first power feed and the second power feed are being executed, instead of inhibiting displaying the second image consistently, displaying the second image is inhibited when electric power of the first power feed is equal to or greater than the threshold. For this reason, it is possible to allow the user to recognize that the second image is not displayed on the display device, thereby intuitively ascertaining that electric power of the first power feed is considerably large.

In the electrically powered vehicle according to the aspect, the electronic control unit may be configured to display a maximum electric power value of the first power feed on the display device in addition to the first image and the electronic control unit may be configured to display a maximum electric power value of the second power feed on the display device in addition to the second image.

In the electrically powered vehicle according to the aspect, the first power feed may be direct-current power feed which is supplied from the power supply device to the external equipment connected to the first outlet. The second power feed is alternating-current power feed into which direct-current electric power from the power supply device is converted, and the alternating-current power feed is supplied to the external equipment connected to the second outlet.

According to the aspect, it is possible to allow the user to intuitively ascertain that electric power of the direct-current power feed is larger than electric power of the alternating-current power feed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the present disclosure will be described in detail referring to the drawings. The same or similar portions in the drawings are represented by the same reference numerals, and description thereof will not be repeated.

Figure 1:
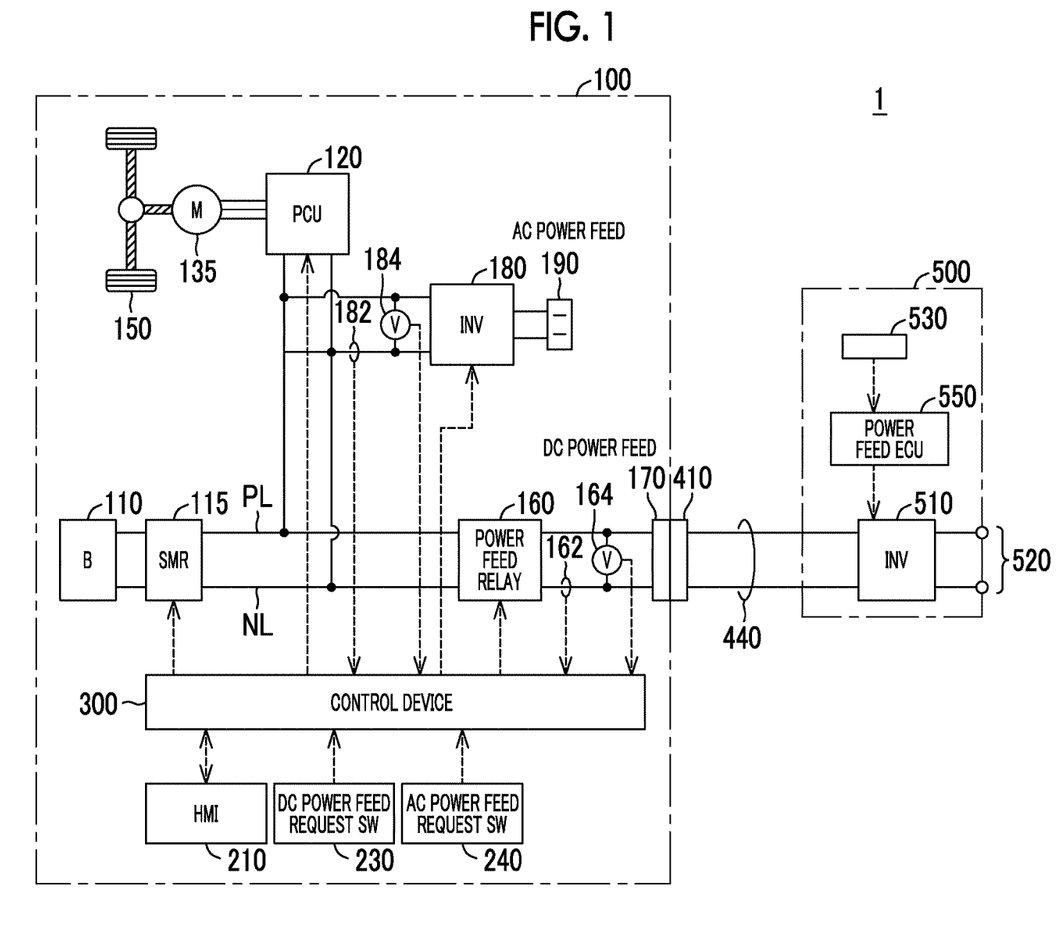
FIG. 1 is a diagram schematically showing the overall configuration of a power feed system according to an embodiment.

FIG. 1 is a diagram schematically showing the overall configuration of a power feed system 1 according to the embodiment. The power feed system 1 according to the embodiment includes a vehicle 100, and an external device 500 configured to be connectable to the vehicle 100.

The vehicle 100 includes a battery 110, a system main relay (SMR) 115, a power control unit (PCU) 120, a motor 135, drive wheels 150, a human machine interface (HMI) device 210, and an electronic control unit 300.

The vehicle 100 is an electric vehicle (EV) that travels by driving the motor 135 with electric power of the battery 110.

The battery 110 is a rechargeable electric power storage device that stores electric power for driving the motor 135. The battery 110 is, for example, a secondary battery, such as a lithium-ion battery, a nickel-hydrogen battery, or a lead storage battery.

The battery 110 is connected to the PCU 120 through a pair of power lines PL, NL (positive power line PL and negative power line NL). Though not shown, the battery 110 is configured to be chargeable with electric power supplied from a power supply outside the vehicle. The battery 110 stores electric power regenerated by the motor 135. An output voltage of the battery 110 is, for example, 200 volts. In the embodiment, the battery 110 functions as a "power supply device" in a case of executing external power feed.

The SMR 115 is provided between the battery 110 and the power lines PL, NL, and is opened and closed based on a control signal from the electronic control unit 300. In a case where the SMR 115 is in a closed state, the battery 110 is connected to the power lines PL, NL.

The PCU 120 includes a converter that performs voltage conversion between the battery 110 and the motor 135, and an inverter 180 that performs electric power conversion (conversion between direct current and alternating current) between the converter and the motor 135. The PCU 120 operates based on a control signal from the electronic control unit 300.

The motor 135 is an alternating-current rotary motor, and is, for example, a permanent magnet type synchronous motor including a rotor embedded with a permanent magnet. Drive torque of the motor 135 is transmitted to the drive wheels 150 to make the vehicle 100 travel. The motor 135 can generate electric power with rotation force of the drive wheels 150 at the time of regenerative braking of the vehicle 100. Then, generated electric power (alternating-current electric power) by the rotation force is converted to charging electric power (direct-current electric power) of the battery 110 by the PCU 120.

The HMI device 210 is a device that provides a user with information for assisting the operation of the vehicle 100. The HMI device 210 includes, for example, a display, a speaker, and the like provided in a vehicle cabin. As the HMI device 210, a display or a speaker of another existing device, for example, a navigation device (not shown) may be diverted.

The vehicle 100 includes, two systems of devices, as a device that performs external power feed, and specifically, a DC power feed device that feeds direct-current electric power to external equipment, and an AC power feed device that feeds alternating-current electric power to external equipment.

The DC power feed device includes a power feed relay 160 and a DC outlet 170. The power feed relay 160 is provided between the power lines PL, NL and the DC outlet 170, and is opened and closed according to a control signal from the electronic control unit 300. In a case where the power feed relay 160 is in a closed stated, direct-current electric power from the battery 110 is output to the DC outlet 170 through the power feed relay 160. The DC outlet 170 is configured to be connectable to a connector 410 of the external device 500 as external equipment. Direct-current electric power received from the power feed relay 160 by the DC outlet 170 is supplied to the external device 500 through the connector 410 and a power cable 440. In this way, in the DC power feed, since direct-current electric power is supplied directly from the battery 110 to the external equipment, large electric power can be supplied.

The AC power feed device includes an inverter 180 and an AC outlet 190. The inverter 180 is provided between the power lines PL, NL and the AC outlet 190. The inverter 180 operates according to a control signal from the electronic control unit 300, converts direct-current electric power from the battery 110 to alternating-current electric power, and outputs alternating-current electric power to the AC outlet 190. Alternating-current electric power received from the inverter 180 by the AC outlet 190 is supplied to external equipment (for example, a charger for a portable terminal, such as a personal computer, a smartphone, or a tablet) (not shown) connected to the AC outlet 190. In FIG. 1, an example where the AC outlet 190 is provided in the vehicle cabin is shown. Accordingly, the AC power feed using the AC power feed device is performed for external equipment carried in the vehicle cabin. In this way, in the AC power feed, since direct-current electric power from the battery 110 is converted to alternating-current electric power, large electric power at the same level as in the DC power feed cannot be supplied to the external equipment due to electric power conversion performance of the inverter 180.

While the AC power feed is provided assuming that comparatively small electric power is supplied, the DC power feed using the DC power feed device is provided assuming that comparatively large electric power is supplied to housing or the like. For this reason, maximum electric power (suppliable electric power) of the DC power feed is set to a value (for example, about 9 kW) greater than maximum electric power (for example, about 1.5 kW) of the AC power feed.

The vehicle 100 further includes a current sensor 162 and a voltage sensor 164 that detect electric power (hereinafter, referred to as "DC power feed electric power") output from the DC outlet 170. The vehicle 100 further includes a current sensor 182 and a voltage sensor 184 that detect electric power (hereinafter, referred to as "AC power feed electric power") output from the AC outlet 190. The sensors transmit detection results to the electronic control unit 300.

The vehicle 100 further includes a DC power feed request switch 230 and an AC power feed request switch 240.

The DC power feed request switch 230 is a switch that is used when the user requests for the DC power feed. In a case where the DC power feed request switch 230 is operated by the user, the electronic control unit 300 brings the SMR 115 and the power feed relay 160 in the closed state to start the DC power feed from the DC outlet 170 to the external device 500.

The AC power feed request switch 240 is a switch that is used when the user requests for the AC power feed. In a case where the AC power feed request switch 240 is operated by the user, the electronic control unit 300 brings the SMR 115 in the closed state and operates the inverter 180 to start the AC power feed from the AC outlet 190.

The electronic control unit 300 is embedded with a central processing unit (CPU) and a memory (not shown). The electronic control unit 300 controls the devices (the PCU 120, the SMR 115, the power feed relay 160, the inverter 180, the HMI device 210, and the like) of the vehicle 100 based on information stored in the memory or information from the sensors.

The external device 500 is configured to be connectable to the DC outlet 170 through the connector 410 and the power cable 440. The external device 500 includes an inverter 510, an output unit 520, an operating unit 530, and a power feed electronic control unit (ECU) 550. The inverter 510 converts direct-current electric power received from the DC outlet 170 to alternating-current electric power and outputs alternating-current electric power to the output unit 520. The output unit 520 is connected to alternating-current electrical equipment, a switchboard of a house, or the like. The operating unit 530 receives a power feed start operation, a power feed stop operation, or the like from the user. The power feed ECU 550 controls the inverter 510 according to an operation of the operating unit 530. With this, power feed from the external device 500 to the electrical equipment connected to the output unit 520 is controlled.

Energy Flow Display of AC Power Feed and DC Power Feed

In a case where the DC power feed and the AC power feed are executed in the vehicle 100 having the configuration described above, an image indicating that the AC power feed is in progress and an image indicating that the DC power feed is in progress are displayed on a screen 211 of the HMI device 210. With this, it is possible to give the user notification that the DC power feed is in progress and the AC power feed is in progress.

At this time, in a case where a display form of the image indicating that the AC power feed is in progress and a display form of the image indicating that the DC power feed is in progress are similar, the magnitude of actual electric power may not match the magnitude of electric power ascertained from the image by the user. Specifically, since the maximum electric power of the DC power feed is set to a value greater than the maximum electric power of the AC power feed, the DC power feed electric power can be larger than the AC power feed electric power. Nevertheless, in a case where the display forms of both images are similar, there is a possibility that the user who views the images erroneously ascertains that the DC power feed electric power substantially has the same magnitude as the AC power feed electric power.

Accordingly, the electronic control unit 300 according to the embodiment in a case of displaying the image indicating that the DC power feed is in progress and the image indicating that the AC power feed is in progress on the screen 211 of the HMI device 210 while the DC power feed and the AC power feed are being executed, the display forms of both images are controlled such that the display form of the image indicating that the DC power feed is in progress is more noticeable than the display form of the image indicating that the AC power feed is in progress. This will be described referring to FIG. 2.

Figure 2:
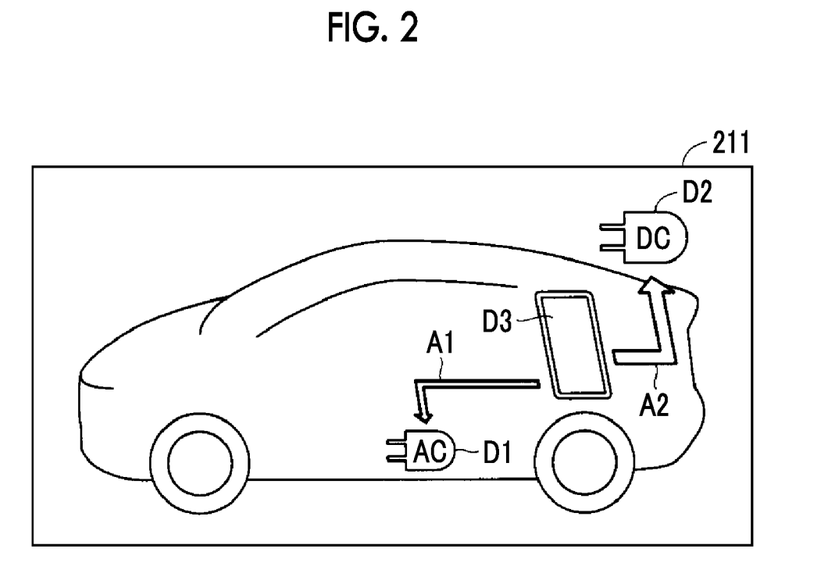
FIG. 2 is a diagram showing an example of a display image of an energy flow.

FIG. 2 is a diagram showing an example of a display image of an energy flow that is displayed on the screen 211 of the HMI device 210 by the electronic control unit 300 while the DC power feed and the AC power feed are being executed.

In a case where the DC power feed and the AC power feed are being executed, an image D1 representing the AC outlet 190, an image D2 representing the DC outlet 170, an image D3 representing the battery 110, an image A1 representing that the AC power feed is being executed, and an image A2 representing that the DC power feed is being executed are displayed on the screen 211 of the HMI device 210.

In the embodiment, as shown in FIG. 2, the image A1 is represented by an arrow line (hereinafter, referred to as an "AC arrow line") indicating the flow of electric power of the AC power feed, and the image A2 is represented by an arrow line (hereinafter, referred to as a "DC arrow line") indicating the flow of electric power of the DC power feed.

Then, as shown in FIG. 2, the DC arrow line is displayed thicker than the AC arrow line. For this reason, the user who views the DC arrow line and the AC arrow line can intuitively ascertain that the DC power feed electric power is larger than the AC power feed electric power.

As described above, the electronic control unit 300 according to the embodiment displays the AC arrow line (the image A1 representing that the AC power feed is being executed) and the DC arrow line (the image A2 representing that the DC power feed is being executed) on the screen 211 of the HMI device 210 in a case where the DC power feed and the AC power feed are being executed. At this time, the electronic control unit 300 makes the DC arrow line thicker than the AC arrow line such that a display form of the DC arrow line is more noticeable than a display form of the AC arrow line. With this, it is possible to allow the user to intuitively ascertain the difference between the magnitude of the DC power feed electric power and the magnitude of the AC power feed electric power, specifically, that the DC power feed electric power is larger than the AC power feed electric power.

First Modification Example

The energy flow shown in FIG. 2 described above is merely an example, and may be modified.

Figure 3:
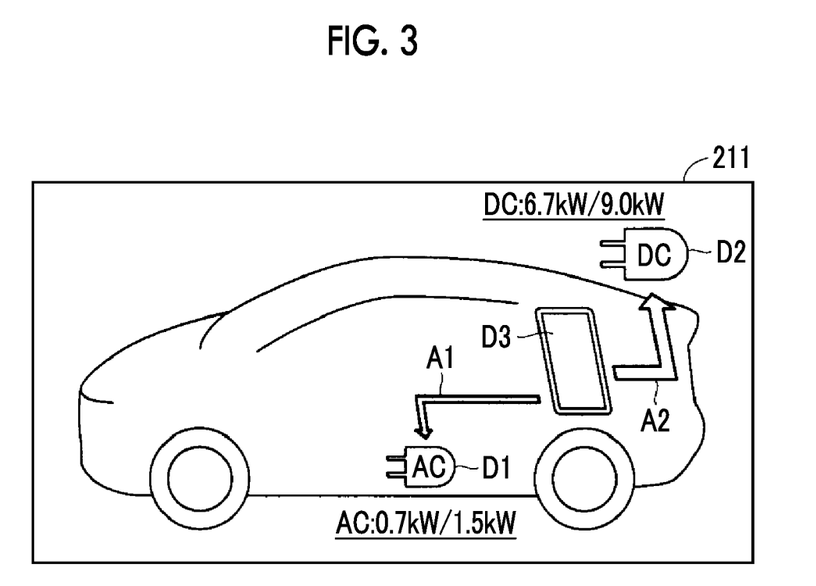
FIG. 3 is a diagram (first modification example) showing an example of a display image of an energy flow.

FIG. 3 is a diagram showing an example of a display image of an energy flow according to a first modification example. An image shown in FIG. 3 includes display of the AC power feed electric power and the maximum electric power (in the example shown in FIG. 3, 0.7 kW/1.5 kW) of the AC power feed below the image D1 representing the AC outlet 190 in addition to the image shown in FIG. 2 described above. The image shown in FIG. 3 further includes display of the DC power feed electric power and the maximum electric power (in the example shown in FIG. 3, 6.7 kW/9.0 kW) of the DC power feed above the image D2 representing the DC outlet 170. With such display, the user can more accurately ascertain the situations of the AC power feed and the DC power feed. The AC power feed electric power and the DC power feed electric power are calculated by the electronic control unit 300.

Second Modification Example

In the above-described embodiment, both of the thickness of the DC arrow line and the thickness of the AC arrow line are not varied even when the magnitude of actual electric power is changed.

In contrast, in a second modification example, the thickness of the DC arrow line is changed depending on the magnitude of the actual DC power feed electric power, and the thickness of the AC arrow line is changed depending on the magnitude of the actual AC power feed electric power.

Figure 4:
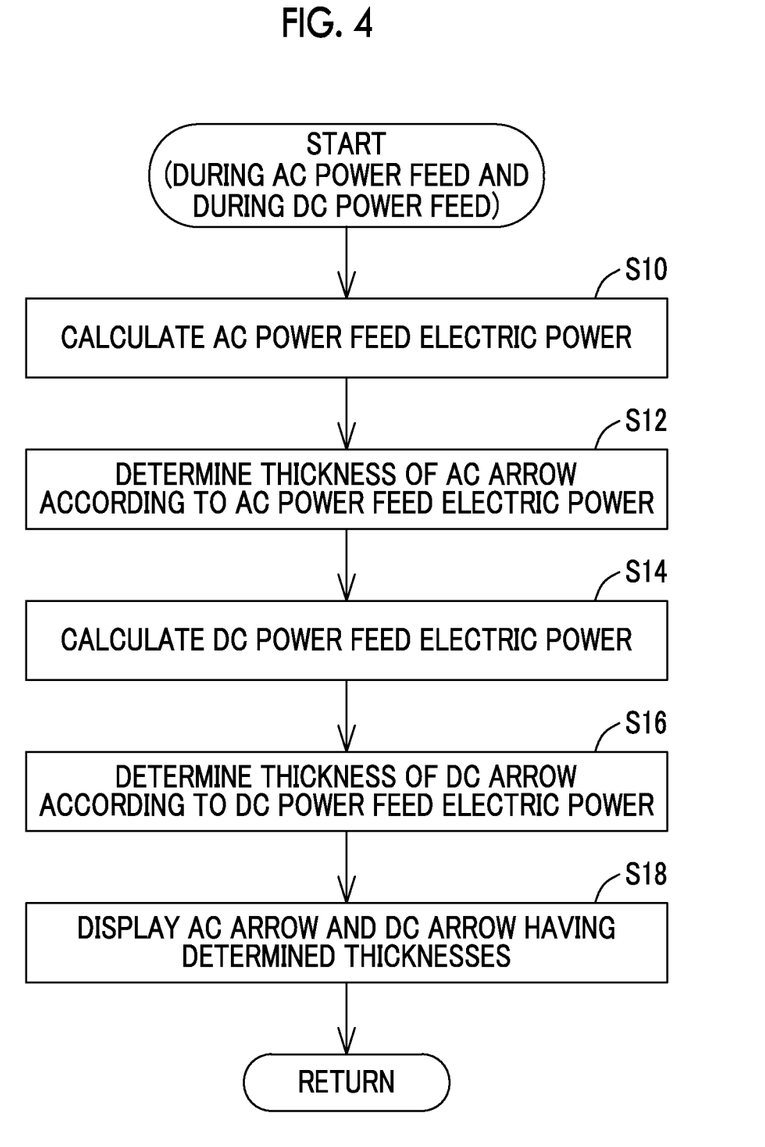
FIG. 4 is a flowchart (second modification example) showing an example of a processing procedure of an electronic control unit.

FIG. 4 is a flowchart showing an example of a processing procedure according to the second modification example that is executed in a case where the electronic control unit 300 displays an energy flow on the screen 211 of the HMI device 210. The flowchart is repeatedly executed in a predetermined cycle in a case where the DC power feed and the AC power feed are being executed.

In Step (hereinafter, Step is abbreviated as "S") 10, the electronic control unit 300 calculates the AC power feed electric power based on outputs of the current sensor 182 and the voltage sensor 184.

Next, the electronic control unit 300 determines the thickness of the AC arrow line according to the AC power feed electric power calculated in S10 (S12). At this time, the electronic control unit 300 determines the thickness of the AC arrow line such that the larger the AC power feed electric power, the larger the value of the thickness of the AC arrow line becomes continuously or discretely.

Next, the electronic control unit 300 calculates the DC power feed electric power based on outputs of the current sensor 162 and the voltage sensor 164 (S14). Then, the electronic control unit 300 determines the thickness of the DC arrow line according to the calculated DC power feed electric power (S16). At this time, the electronic control unit 300 determines the thickness of the DC arrow line such that the larger the DC power feed electric power, the larger the thickness of the DC arrow line becomes continuously or discretely. The electronic control unit 300 determines the thickness of the DC arrow line such that the DC arrow line is thicker than at least the AC arrow line.

Next, the electronic control unit 300 displays the AC arrow line having the thickness determined in S12 and the DC arrow line having the thickness determined in S16 on the screen 211 of the HMI device 210 (S18).

With such display, since the AC arrow line and the DC arrow line have thicknesses reflecting the actual AC power feed electric power and DC power feed electric power, respectively, it is possible to allow the user to more accurately ascertain the magnitude of the AC power feed electric power and the DC power feed electric power.

In FIG. 4 described above, the thickness of the DC arrow line is changed depending on the magnitude of the actual DC power feed electric power, and the thickness of the AC arrow line is changed depending on the magnitude of the actual AC power feed electric power. However, considering that the AC power feed electric power is smaller than the DC power feed electric power, the thickness of the AC arrow line may be set to a fixed value, and the thickness of the DC arrow line may be changed depending on the magnitude of the actual DC power feed electric power exclusively.

Third Modification Example

In the above-described embodiment, the electronic control unit 300 makes the DC arrow line thicker than the AC arrow line while the DC power feed and the AC power feed are being executed, thereby making the DC arrow line (image A2) more noticeable than the AC arrow line (image A1).

However, a method of making the DC arrow line noticeable is not limited thereto. For example, the electronic control unit 300 may display the DC arrow line on the screen 211 of the HMI device 210 exclusively, and may inhibit displaying the AC arrow line while the DC power feed and the AC power feed are being executed.

Figure 5:
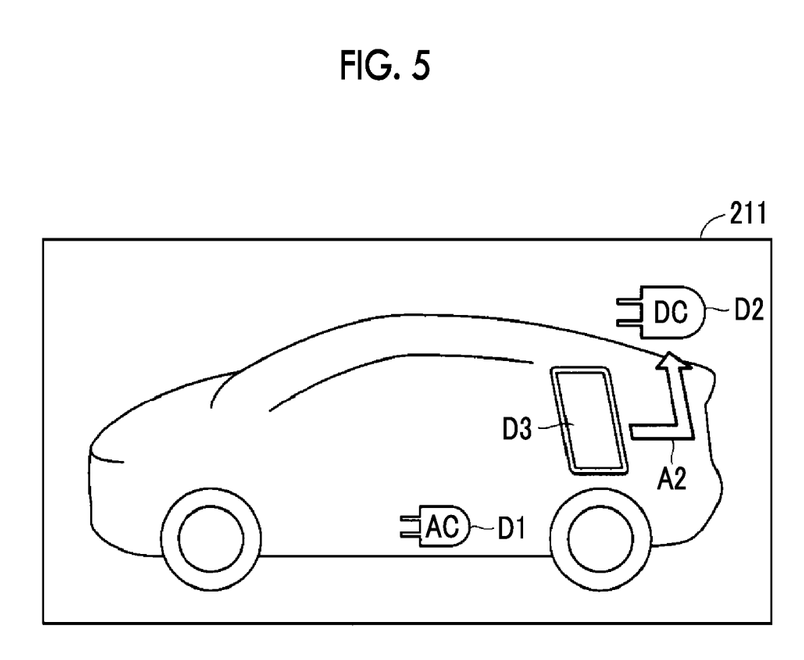
FIG. 5 is a diagram (third modification example) showing an example of a display image of an energy flow.

FIG. 5 is a diagram showing an example of a display image of an energy flow according to a third modification example. In an image shown in FIG. 5, the AC arrow line (image A1) is omitted from the image shown in FIG. 2 described above. With such display, it is possible to allow the user to intuitively ascertain that the DC power feed electric power is considerably large such that the AC power feed electric power is negligible.

Fourth Modification Example

In the third modification example described above, in a case where the DC power feed and the AC power feed are being executed, displaying the AC arrow line (image A1) consistently is inhibited.

In contrast, in a case where the DC power feed and the AC power feed are being executed, and in a case where the DC power feed electric power is small, the AC arrow line (image A1) may be displayed along with the DC arrow line (image A2). In a case where the DC power feed electric power is large, the DC arrow line (image A2) may be displayed exclusively and displaying the AC arrow line (image A1) may be inhibited.

Figure 6:
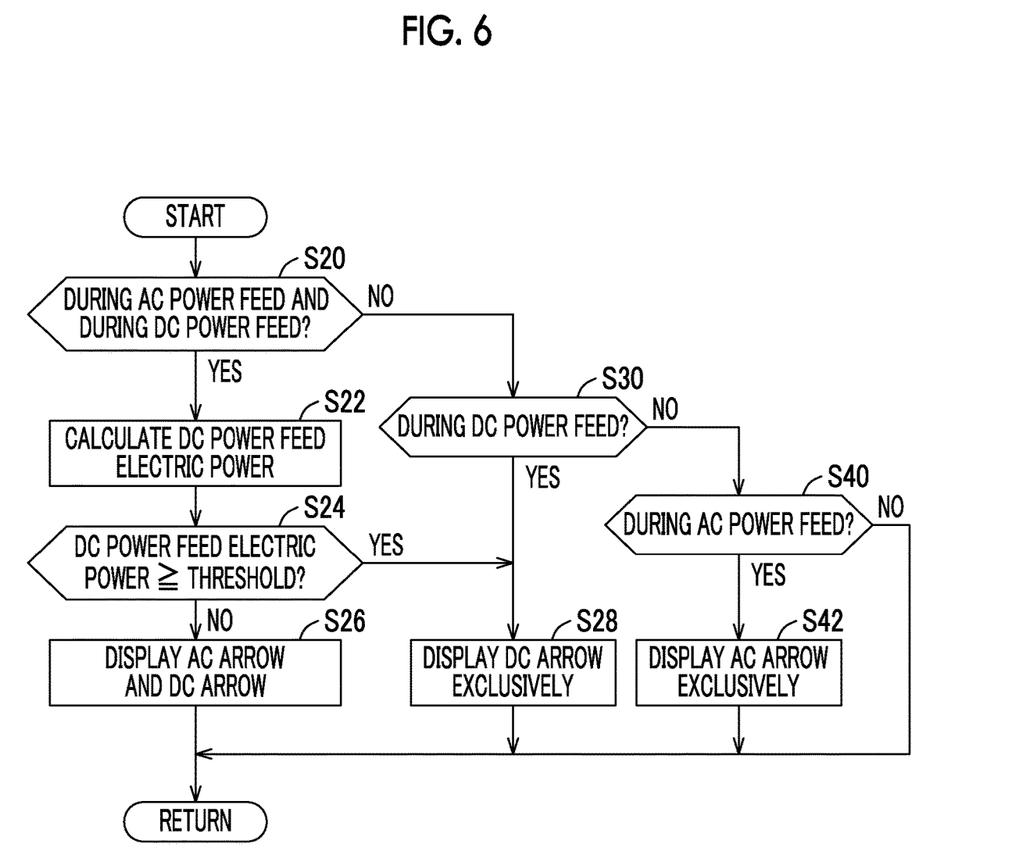
FIG. 6 is a flowchart (fourth modification example) showing an example of a processing procedure of the electronic control unit.

FIG. 6 is a flowchart showing an example of a processing procedure according to a fourth modification example that is executed in a case where the electronic control unit 300 displays an energy flow on the screen 211 of the HMI device 210. The flowchart is repeatedly executed in a predetermined cycle. The electronic control unit 300 determines whether or not the AC power feed is in progress and the DC power feed is in progress (S20).

In a case where the AC power feed is in progress and the DC power feed is in progress (in S20, YES), the electronic control unit 300 calculates the DC power feed electric power based on the outputs of the current sensor 162 and the voltage sensor 164 (S22).

The electronic control unit 300 determines whether or not the DC power feed electric power calculated in S22 is equal to or greater than a threshold defined in advance (S24).

In a case where the DC power feed electric power is less than the threshold (in S24, NO), the electronic control unit 300 displays both of the AC arrow line (image A1) and the DC arrow line (image A2) on the screen 211 of the HMI device 210 (S26).

In a case where the DC power feed electric power is equal to or greater than the threshold (in S24, YES), the electronic control unit 300 displays the DC arrow line (image A2) on screen 211 of the HMI device 210 exclusively (S28). That is, in a case where the DC power feed electric power is equal to or greater than the threshold, the DC power feed electric power is considerably larger than the AC power feed electric power, and an influence of the AC power feed electric power on a state of charge (SOC) of the battery 110 is considerably smaller than an influence of the DC power feed electric power on the SOC of the battery 110. For this reason, even when the AC power feed is in progress and the DC power feed is in progress, in a case where the DC power feed electric power is equal to or greater than the threshold, the electronic control unit 300 displays the DC arrow line (image A2) exclusively, and inhibits displaying the AC arrow line (image A1). The user recognizes that the AC arrow line (image A1) is not displayed on the screen 211 of the HMI device 210, thereby intuitively ascertaining that the DC power feed electric power is considerably large such that the AC power feed electric power is negligible.

In a case where the AC power feed is in progress and the DC power feed is not in progress (in S20, NO), the electronic control unit 300 determines whether or not the DC power feed is in progress (S30), and determines whether or not the AC power feed is in progress (S40). Then, in a case where the DC power feed is in progress (in S30, YES), the DC arrow line (image A2) is displayed exclusively (S28), and in a case where the AC power feed is in progress (in S40, YES), the AC arrow line (image A1) is displayed exclusively (S42).

Fifth Modification Example

In the above-described embodiment, although the vehicle 100 that is executable the DC power feed and the AC power feed has been described, a combination of external power feed that is executable by the vehicle 100 may be a combination of two systems of external power feed with different maximum electric power, and is not necessarily limited to a combination of the DC power feed and the AC power feed.

For example, a combination of external power feed that is executable by the vehicle 100 may be a combination of DC power feed with different maximum electric power, or may be a combination of AC power feed with different maximum electric power.

Sixth Modification Example

In the above-described embodiment, the vehicle 100 is an electric vehicle (EV), and the battery 110 functions as a "power supply device" in a case of executing external power feed.

However, the vehicle 100 that the present disclosure is applicable is not limited to an electric vehicle (EV), and may be a hybrid vehicle (Plug-in Hybrid Vehicle (PHV)) or a fuel cell vehicle (FCV).

In a hybrid vehicle, in general, a generator that generates electric power using power of an engine is mounted in addition to an electric power storage device. Accordingly, in the hybrid vehicle, one or both of the in-vehicle electric power storage device and the generator functions as a "power supply device" in a case of executing external power feed.

In a fuel cell vehicle, a fuel cell that generates electric power using hydrogen as fuel is mounted in addition to an electric power storage device. Accordingly, in the fuel cell vehicle, one or both of the in-vehicle electric power storage device and the fuel cell functions as a "power supply device" in a case of executing external power feed.

The embodiment and the modification examples described above can be suitably combined as long as no technical inconsistency occurs.

The embodiment disclosed herein is to be considered merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. An electrically powered vehicle comprising:
   a power supply device;
   a first outlet configured to be connectable to external equipment that is not constituent equipment of a vehicle;
   a second outlet configured to be connectable to external equipment that is not constituent equipment of the vehicle;
   a display device configured to display a first image representing that a first power feed for feeding electric power from the power supply device to the external equipment connected to the first outlet is being executed and a second image representing that a second power feed for feeding electric power from the power supply device to the external equipment connected to the second outlet is being executed; and
   an electronic control unit configured to control an image that is displayed on the display device,
   wherein maximum electric power of the first power feed is greater than maximum electric power of the second power feed, and when the first power feed and the second power feed are being executed, the electronic control unit is configured to control a display form of the first image and a display form of the second image such that the display form of the first image is more noticeable than the display form of the second image.

2. The electrically powered vehicle according to claim 1, wherein:
   the first image is represented by a line indicating a flow of electric power of the first power feed;
   the second image is represented by a line indicating a flow of electric power of the second power feed; and
   the line of the first image is thicker than the line of the second image.

3. The electrically powered vehicle according to claim 2, wherein the electronic control unit is configured to perform the display device such that the display device makes the line of the first image thicker when electric power of the first power feed is larger than in a case where electric power of the first power feed is small.

4. The electrically powered vehicle according to claim 3, wherein the electronic control unit is configured to inhibit changing a thickness of the line of the second image depending on magnitude of electric power of the second power feed.

5. The electrically powered vehicle according to claim 1, wherein the electronic control unit is configured to display a maximum electric power value of the first power feed on the display device in addition to the first image and the electronic control unit is configured to display a maximum electric power value of the second power feed on the display device in addition to the second image.

6. The electrically powered vehicle according to claim 1, wherein:
   the first power feed is a direct-current power feed which is supplied from the power supply device to the external equipment connected to the first outlet; and
   the second power feed is an alternating-current power feed into which direct-current electric power from the power supply device is converted, and the alternating-current power feed is supplied to the external equipment connected to the second outlet.

7. An electrically powered vehicle comprising:
   a power supply device;
   a first outlet configured to be connectable to external equipment that is not constituent equipment of a vehicle;
   a second outlet configured to be connectable to external equipment that is not constituent equipment of the vehicle;
   a display device configured to display a first image representing that a first power feed for feeding electric power from the power supply device to the external equipment connected to the first outlet is being executed and a second image representing that a second power feed for feeding electric power from the power supply device to the external equipment connected to the second outlet is being executed; and
   an electronic control unit configured to control an image that is displayed on the display device,
   wherein maximum electric power of the first power feed is greater than maximum electric power of the second power feed, and when the first power feed and the second power feed are being executed, the electronic control unit is configured to control a display form of the first image and a display form of the second image such that the display form of the first image is more noticeable than the display form of the second image,
   wherein the electronic control unit is configured to display the first image on the display device and to inhibit displaying the second image on the display device when the first power feed and the second power feed are being executed.

8. The electrically powered vehicle according to claim 7, wherein the electronic control unit is configured to display the first image on the display device and to inhibit displaying the second image on the display device when the first power feed and the second power feed are being executed and when electric power of the first power feed is equal to or greater than a threshold.

* * * * *